(12) United States Patent
Kiehn

(10) Patent No.: US 9,081,618 B2
(45) Date of Patent: Jul. 14, 2015

(54) METHOD AND APPARATUS FOR THE SCHEDULING OF COMPUTING TASKS

(75) Inventor: Max Kiehn, Aurora (CA)

(73) Assignee: ATI Technologies ULC, Markham, Ontario (CA)

( * ) Notice: Subject to any disclaimer, the term of this patent is extended or adjusted under 35 U.S.C. 154(b) by 351 days.

(21) Appl. No.: 13/424,097

(22) Filed: Mar. 19, 2012

(65) Prior Publication Data
US 2013/0247061 A1 Sep. 19, 2013

(51) Int. Cl.
*G06F 9/46* (2006.01)
*G06F 9/50* (2006.01)
*G06F 3/12* (2006.01)

(52) U.S. Cl.
CPC .......... *G06F 9/5044* (2013.01); *G06F 3/126* (2013.01); *G06F 2209/506* (2013.01)

(58) Field of Classification Search
CPC .......... G06F 9/5027; G06F 9/5044; G06F 2209/506; G06F 3/126
USPC .................................. 718/104, 100, 102
See application file for complete search history.

(56) References Cited

U.S. PATENT DOCUMENTS

| | | | |
|---|---|---|---|
| 6,236,883 B1 * | 5/2001 | Ciaccio et al. | 600/515 |
| 6,850,895 B2 * | 2/2005 | Brodersen et al. | 705/7.14 |
| 7,761,875 B2 * | 7/2010 | Karamanolis et al. | 718/102 |
| 7,793,297 B2 * | 9/2010 | Aggarwal et al. | 718/104 |
| 7,934,215 B2 | 4/2011 | Narayan et al. | |
| 8,018,953 B1 | 9/2011 | Zhao | |
| 8,225,319 B2 * | 7/2012 | Laithwaite et al. | 718/102 |
| 2003/0084155 A1 * | 5/2003 | Graupner et al. | 709/226 |
| 2004/0073789 A1 * | 4/2004 | Powers | 713/165 |
| 2007/0094665 A1 * | 4/2007 | Jackson | 718/104 |
| 2007/0234365 A1 * | 10/2007 | Savit | 718/104 |
| 2008/0126547 A1 * | 5/2008 | Waldspurger | 709/226 |
| 2008/0262763 A1 * | 10/2008 | Sedeh | 702/66 |
| 2009/0064156 A1 * | 3/2009 | He et al. | 718/104 |
| 2012/0198073 A1 * | 8/2012 | Srikanth et al. | 709/226 |
| 2013/0170078 A1 * | 7/2013 | Kumar et al. | 361/19 |
| 2013/0174144 A1 * | 7/2013 | Cheng et al. | 718/1 |
| 2013/0174175 A1 * | 7/2013 | Bachar et al. | 718/104 |

OTHER PUBLICATIONS

Peh et al. "The design and development of a distributed scheduler agent", IEEE Second International Conference on Algorithms & Architectures for Parallel Processing, ICAPP 96. Jun. 11-13, 1996, pp. 108-115.*

* cited by examiner

*Primary Examiner* — Emerson Puente
*Assistant Examiner* — Willy W Huaracha
(74) *Attorney, Agent, or Firm* — Volpe and Koenig, P.C.

(57) ABSTRACT

Described herein are methods and related apparatus for the allocation of computing resources to perform computing tasks. The methods described herein may be used to allocate computing tasks to many different types of computing resources, such as processor cores, individual computers, and virtual machines. Characteristics of the available computing resources, as well as other aspects of the computing environment, are modeled in a multidimensional coordinate system. Each coordinate point in the coordinate system corresponds to a unique combination of attributes of the computing resources/computing environment, and each coordinate point is associated with a weight that indicates the relative desirability of the coordinate point. To allocate a computing resource to execute a task, the weights of the coordinate points, as well as other related factors, are analyzed.

22 Claims, 10 Drawing Sheets

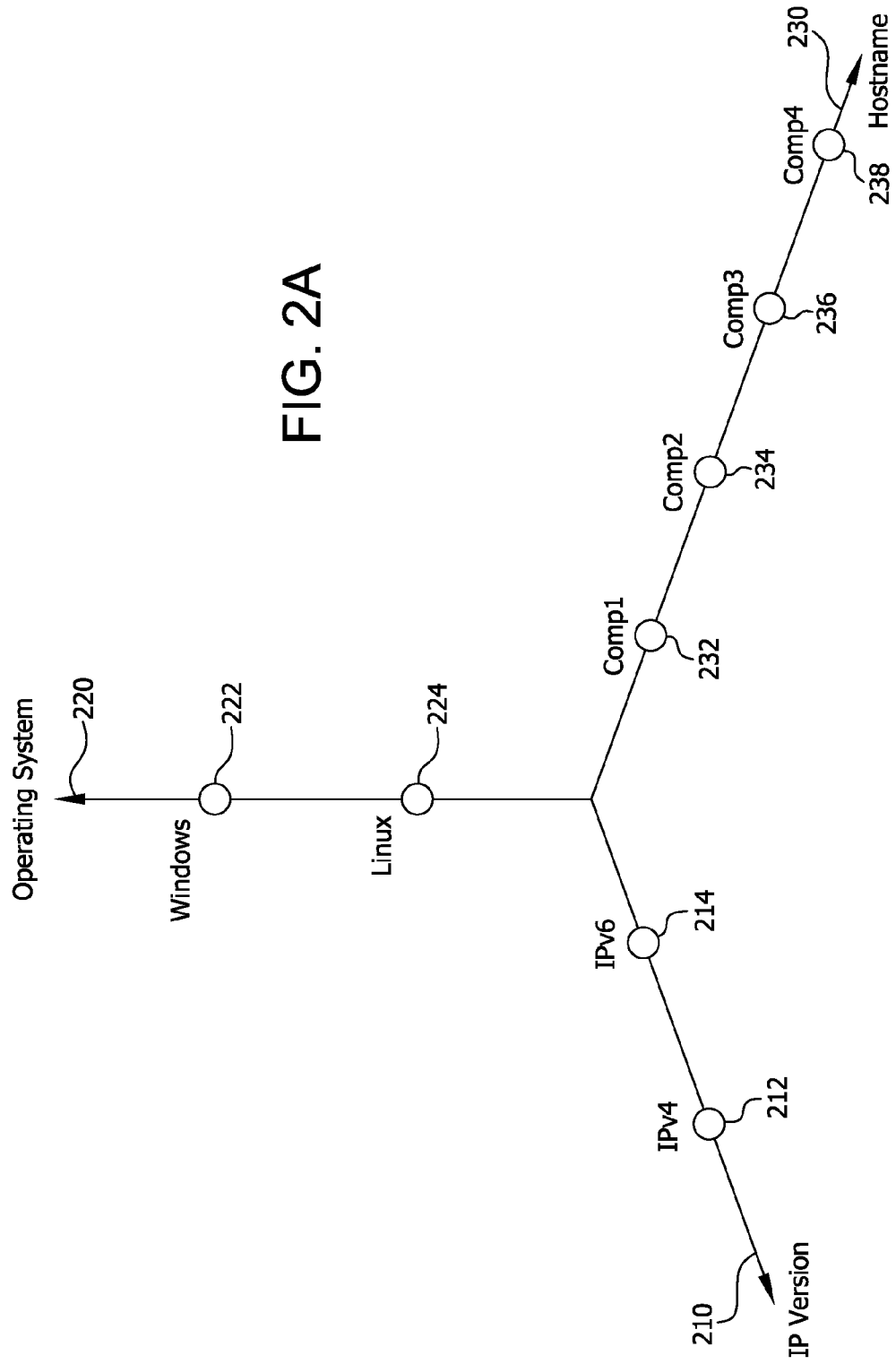

US 9,081,618 B2

METHOD AND APPARATUS FOR THE SCHEDULING OF COMPUTING TASKS

FIELD OF INVENTION

The features described herein relate to the allocation of computing resources to perform computing tasks.

BACKGROUND

A common problem that is faced in many different computing environments is how a limited amount of resources should be allocated, in order to efficiently and effectively perform computing tasks. In the cloud computing environment, as one example, it can be difficult to determine which virtual machine out of a number of available virtual machines is best-suited to execute an incoming job. As another example, in the context of a multi-core processor, it can be challenging to determine the most effective way to assign the cores to execute different blocks of instructions.

Current resource allocation systems possess a number of limitations. For example, many current systems require computing resources to be modeled in an inflexible fashion, so that changes in the way that resources are modeled are difficult to implement. Additionally, in many systems, the performance of resources over time is not monitored (or is monitored in an ineffective way), such that the systems are unable to react to changing conditions at the different resources. Thus, the technologies described herein, which overcome the above-mentioned issues and well as other related issues, would be advantageous.

SUMMARY OF EMBODIMENTS

Described herein is a method for allocating computing tasks for execution by computing resources. The method includes storing, in a memory device, information that describes a plurality of computing resources. The information that describes the computing resources is organized as a multidimensional coordinate system that includes a plurality of coordinate points. Each of the coordinate points corresponds to a computing resource from the plurality of computing resources, each of the coordinate points corresponds to a combination of attributes of the computing resource to which the coordinate point corresponds, and each of the coordinate points is associated with a weight. The method further includes receiving, at a processor, information that defines a computing task. The information that defines the computing task includes constraint information that defines constraints on computing resources on which the computing task can be executed. The method further includes selecting, at the processor, a computing resource from the plurality of computing resources based on the information that describes the plurality of computing resources and the constraint information, and also includes executing, at the selected computing resource, the computing task.

A system for allocating computing tasks for execution by computing resources includes a plurality of computing resources, at least one memory device, and at least one processor. The at least one memory device is configured to store information that describes the plurality of computing resources. The information that describes the computing resources is organized as a multidimensional coordinate system that includes a plurality of coordinate points. Each of the coordinate points corresponds to a computing resource from the plurality of computing resources, each of the coordinate points corresponds to a combination of attributes of the computing resource to which the coordinate point corresponds, and each of the coordinate points is associated with a weight. The at least one processor is configured to receive information that defines a computing task. The information that defines the computing task includes constraint information that defines constraints on computing resources on which the computing task can be executed, and to select a computing resource from the plurality of computing resources based on the information that describes the plurality of computing resources and the constraint information. The selected computing resource is configured to execute the computing task.

A non-transitory computer-readable medium has instructions stored hereon which, when executed by at least one processor, cause the at least one processor to perform a method for allocating computing tasks for execution by computing resources. The method includes the at least one processor storing, in a memory device, information that describes a plurality of computing resources. The information that describes the computing resources is organized as a multidimensional coordinate system that includes a plurality of coordinate points. Each of the coordinate points corresponds to a computing resource from the plurality of computing resources, each of the coordinate points corresponds to a combination of attributes of the computing resource to which the coordinate point corresponds, and each of the coordinate points is associated with a weight. The method further includes the at least one processor receiving information that defines a computing task. The information that defines the computing task includes constraint information that defines constraints on computing resources on which the computing task can be executed. The method further includes the at least one processor selecting a computing resource from the plurality of computing resources based on the information that describes the plurality of computing resources and the constraint information, and the at least one processor executing the computing task at the selected computing resource.

BRIEF DESCRIPTION OF THE DRAWINGS

A more detailed understanding may be had from the following description, given by way of example in conjunction with the accompanying drawings wherein:

FIGS. 2A-2E show an example of a multidimensional coordinate system that may be used with the method of FIGS. 1A-1B;

DETAILED DESCRIPTION OF THE EMBODIMENTS

Described herein are methods and related apparatus for the allocation of computing resources to perform computing tasks. The methods described herein, such as the method shown in FIGS. 1A-1B, may be used to allocate computing tasks to many different types of computing resources, such as processors, processor cores, individual computers, and virtual machines. As described in further detail below, attributes of the available computing resources are modeled in a multidimensional coordinate system. Each coordinate point in the coordinate system corresponds to a unique combination of attributes of the computing resources, and each coordinate point is associated with a weight that indicates the relative desirability of the coordinate point. The weights are adjusted whenever a task is completed, to indicate whether the task was completely successfully, thereby ensuring that better computing resource (i.e., those where tasks are typically executed successfully) are associated with higher weights and that less desirable computing resources are associated with lower weights. Additionally, weights are periodically lowered, to ensure that the weights represent recent performance, as opposed to past performance. To allocate a computing resource to execute a task, the weights of the coordinate points, as well as other related factors, are analyzed.

As used herein, the term "computing resource" includes but is not limited to a resource such as a processor (such as but not limited to a central processing unit (CPU) or graphics processing unit (GPU)), a processor core (in a processor such as but not limited to a CPU or GPU), a computer, a virtual machine, or any other computing device or virtual representation of a computing device. The term "computing task" as used herein is a task, action, or series of actions that can be executed by a computing resource. Examples of computing tasks include but are not limited to an executable program or script, a procedure call or function, a macro, a thread or process, a job, an application, or a block of processor-executable instructions. Alternatively or additionally, a computing task may be a software test application or a test script, such as a benchmarking application or unit test.

Figure 1A:
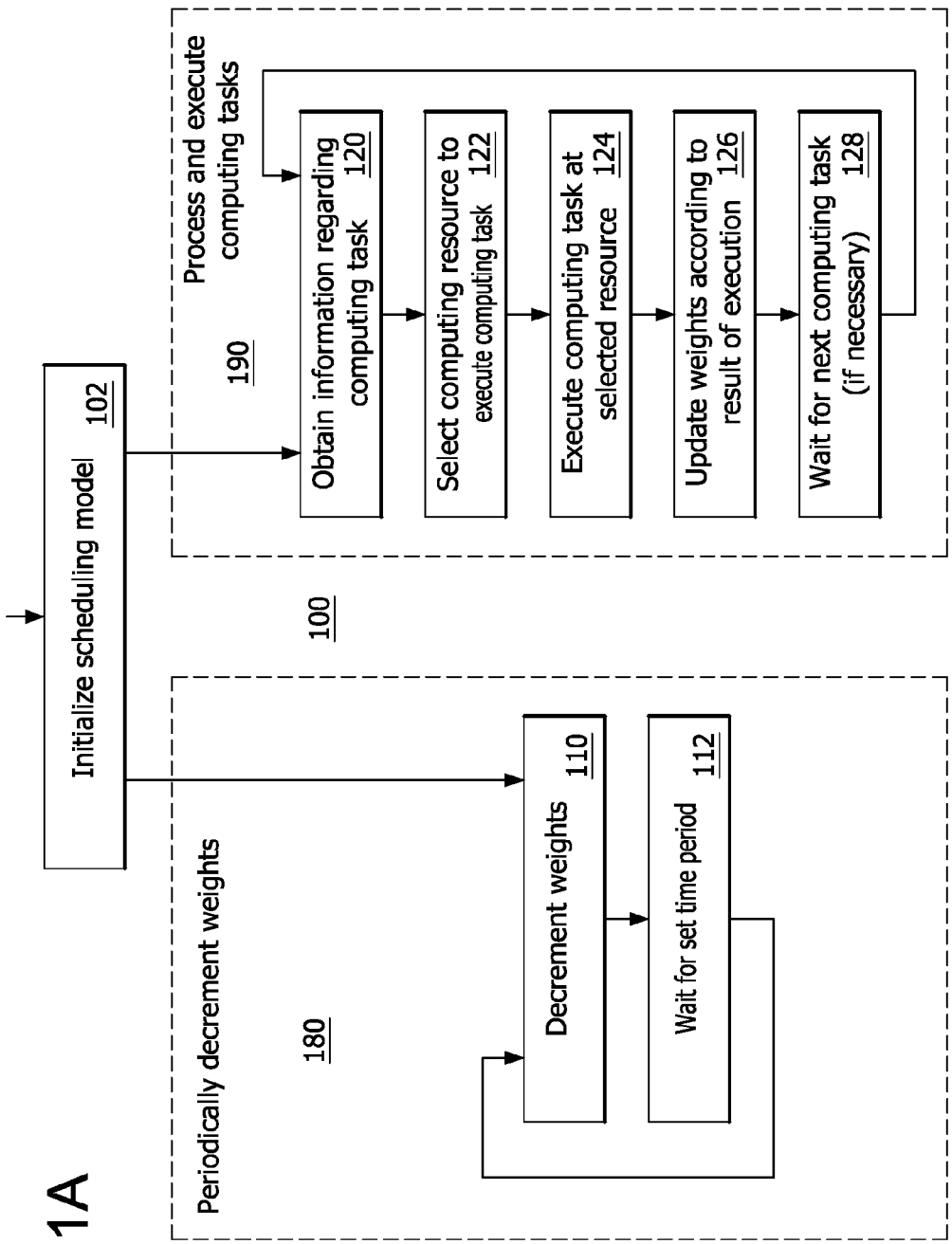
FIGS. 1A-1B show a method for allocating a computing resource to execute a computing task.
Figure 1B:
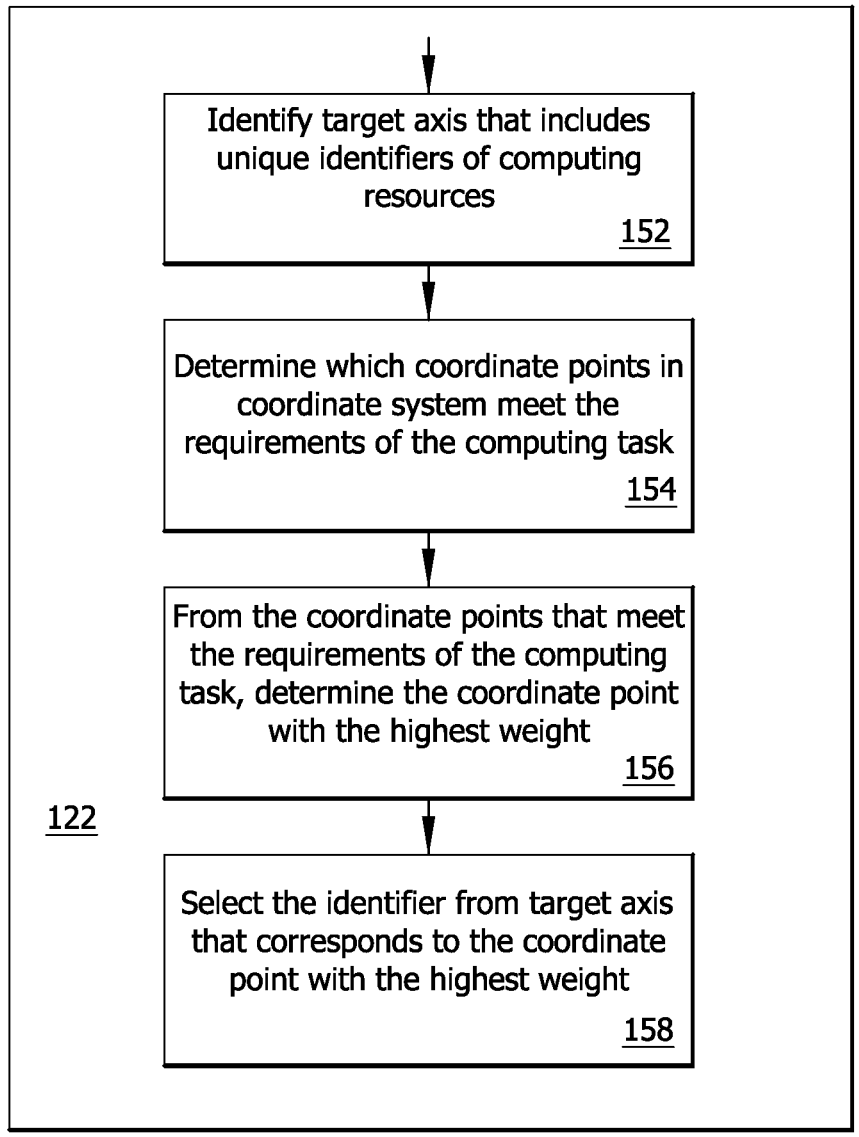

In the method of FIGS. 1A-1B, a computing resource is allocated out of a number of available computing resources, and assigned to perform a computing task. To perform the method of FIGS. 1A-1B, a data structure (referred to herein as the "scheduling model") is used to describe the available computing resources, as well as other related aspects of the environment. In the scheduling model, the available computing resources are modeled in terms of a multidimensional coordinate system that is made up of two or more axes or dimensions. Each axis in the coordinate system relates to some attribute or aspect of the computing resources, and each point on each axis represents a particular instance of that attribute or aspect. As one example, the method of FIGS. 1A-1B may be used in the context of a distributed software testing environment. The testing environment may be composed of a number of different test computers, each of which has different characteristics, such as the type of CPU in the computer and the operating system running on the computer. In this example, the coordinate system in the scheduling model may include a "type of CPU" axis, and the points on this axis might be "32-bit" and "64-bit." As another example, one of the axes in the scheduling model might be labeled as "type of operating system," and the points on this axis might be "Linux" or "Windows." Each coordinate point in the multidimensional coordinate system corresponds to a different possible combination of attributes, based on the axes and the points on the axes. The following table (Table 1) shows an example of how this may be illustrated, using the above example that includes a "type of CPU" axis and "type of operating system" axis:

TABLE 1

|  | 32-bit | 64-bit |
|---|---|---|
| Linux | [32-bit, Linux] | [64-bit, Linux] |
| Windows | [32-bit, Windows] | [64-bit, Windows] |

In Table 1, the X axis corresponds to the "type of CPU" axis and the Y axis corresponds to the "type of operating system" axis.

The scheduling model is defined such that, for at least one of the axes, each of the points on the axis uniquely identifies one of the available computing resources. For example, in an instance where the scheduling model is used to model how instructions can be scheduled for execution on a number of different processor cores in a multi-core processor, the scheduling model may include a "Core ID" axis, where each point on the axis is a unique identifier for each of the available cores (e.g., "Core 1," "Core 2, "Core 3," and so on.) By using this "identification" axis, each of the coordinate points in the coordinate system corresponds to one of the available resources, and it can be determined which resource the different coordinate points are associated with.

The scheduling model also includes data that indicates a value (referred to herein as a "weight") for each coordinate point in the multidimensional coordinate system. These weights, as will be described in further detail below, are used to determine whether a particular computing resource should be selected for the performance of a computing task. The weights may be stored in the scheduling module using a multidimensional array, wherein each element in the multidimensional array corresponds to a combination of coordinates. A weight that is higher indicates that the coordinate point is more desirable for performing a computing task, while a lower weight indicates that a coordinate point is less desirable for performing a computing task. A weight of −1 or lower indicates that the combination of coordinates at that coordinate point is invalid, incompatible, or otherwise not acceptable.

Referring again to the above example that includes a "type of CPU" axis and a "type of operating system" axis, the weights associated with these axes may be represented as shown in Table 2:

TABLE 2

|  | 32-bit | 64-bit |
|---|---|---|
| Linux | Weight: 11 [32-bit, Linux] | Weight: 4 [64-bit, Linux] |
| Windows | Weight: 2 [32-bit, Windows] | Weight: 3 [64-bit, Windows] |

In Table 2, the X axis corresponds to the "type of CPU" axis, and the Y axis corresponds to the "type of OS" axis. As shown in Table 2, the weight for the entry at [32-bit, Linux] is 11, the weight for the entry at [64-bit, Linux] is 4, the weight for the entry at [32-bit, Windows] is 2, and the weight for the entry at [64-bit, Windows] is 3.

To further elaborate on the above example, FIGS. 2A-2E show another example, wherein three axes/dimensions are used. The example of FIGS. 2A-2E relates to a testing environment that includes a four test computers (Computer 1, Computer 2, Computer 3, and Computer 4), where each of the computers has a hostname, an operating system, and supports one or more of Internet Protocol (IP version 4 (IPv4) and IP version 6 (IPv6). The axes in this example include a "Hostname" axis (which includes points for "Comp1," "Comp2," "Comp3," and "Comp4," and which uniquely identifies the four test computers), an "IP version" axis (which includes coordinates for "IPv4" and "IPv6"), and an "Operating System" axis (which includes points for "Linux" and "Windows"). The four computers in this example have the following example attributes, which are shown in Table 3:

TABLE 3

| | Hostname | Operating System | IP Version |
|---|---|---|---|
| Computer 1 | Comp1 | Linux and Windows | IPv4 only |
| Computer 2 | Comp2 | Windows only | IPv4 and IPv6 |
| Computer 3 | Comp3 | Linux and Windows | IPv4 and IPv6 |
| Computer 4 | Comp4 | Linux only | IPv4 and IPv6 |

FIG. 2A shows the "IP Version" axis 210, the "Operating System" axis 220, and the "Hostname" axis 230. The "IP Version" axis includes two coordinates, the "IPv4" coordinate 212 and the "IPv6" coordinate 214. The "Operating System" axis 220 includes the "Windows" coordinate 222 and the "Linux" coordinate 224. The "Hostname" axis 230 includes four points: the "Comp1" coordinate 232, the "Comp2" coordinate 234, the "Comp3" coordinate 236, and the "Comp4" coordinate 238.

Figure 2B:
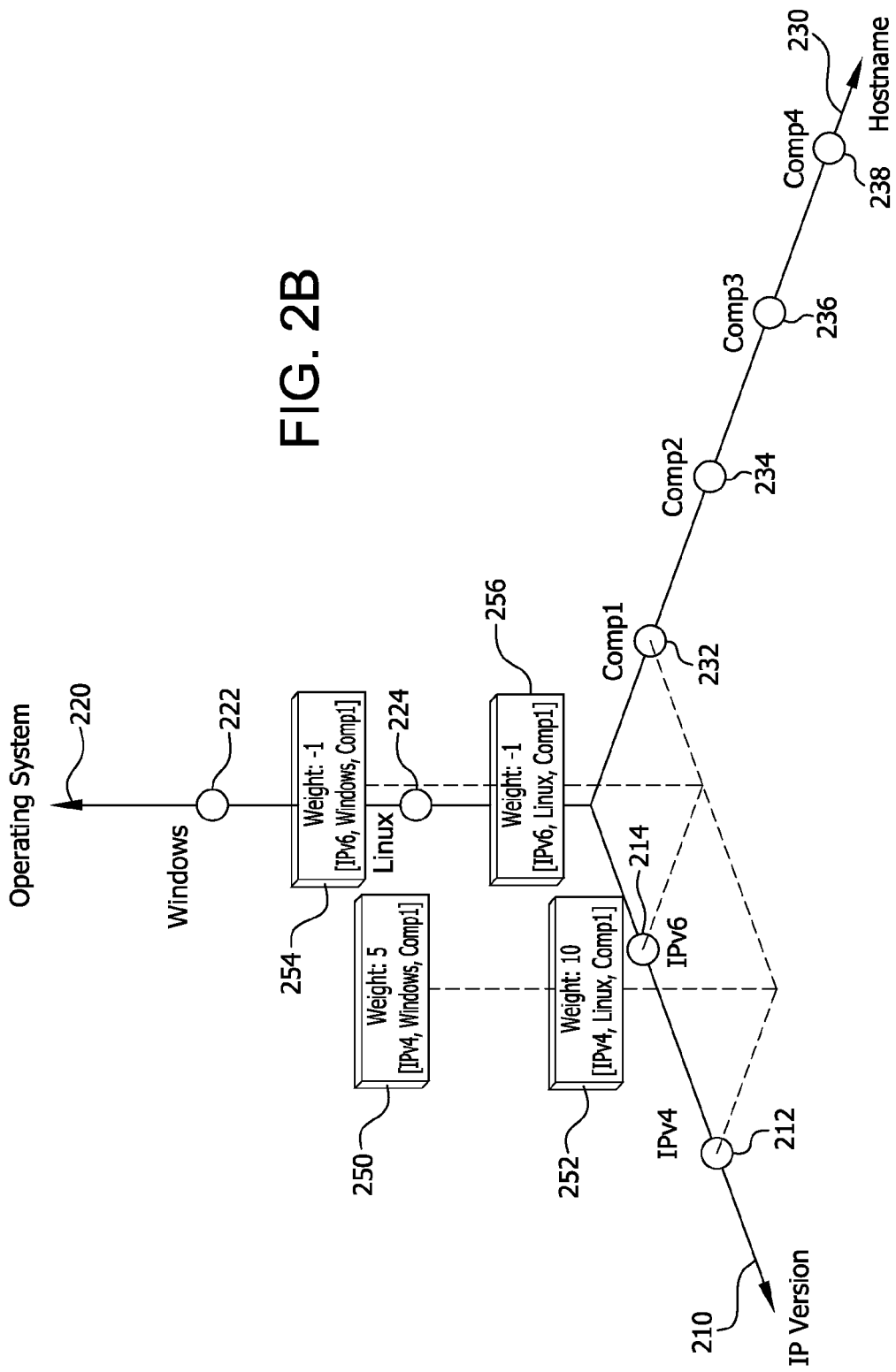

As shown in Table 3, Computer 1 has Linux and Windows installed, and supports IPv4 but does not support IPv6. FIG. 2B shows the elements shown in FIG. 2A, and also shows four coordinate points 250, 252, 254, 256 that corresponds to attributes of Computer 1. The four coordinate points 250, 252, 254, 256 shown in FIG. 2B include a first coordinate point 254 at [IPv6, Windows, Comp1] that has a weight of −1, and a second coordinate point 256 at [IPv6, Linux, Comp1] that has a value of −1. These values of −1 for these coordinate points 254, 256 reflect that Computer 1 does not support IPv6. FIG. 2B also shows a third coordinate point 250 at [IPv4, Windows, Comp1] and a fourth coordinate point 252 at [IPv6, Linux, Comp1]. These weights for these coordinate points 250, 252 (which are above 0) reflect that Computer 1 supports IPv4.

Figure 2C:
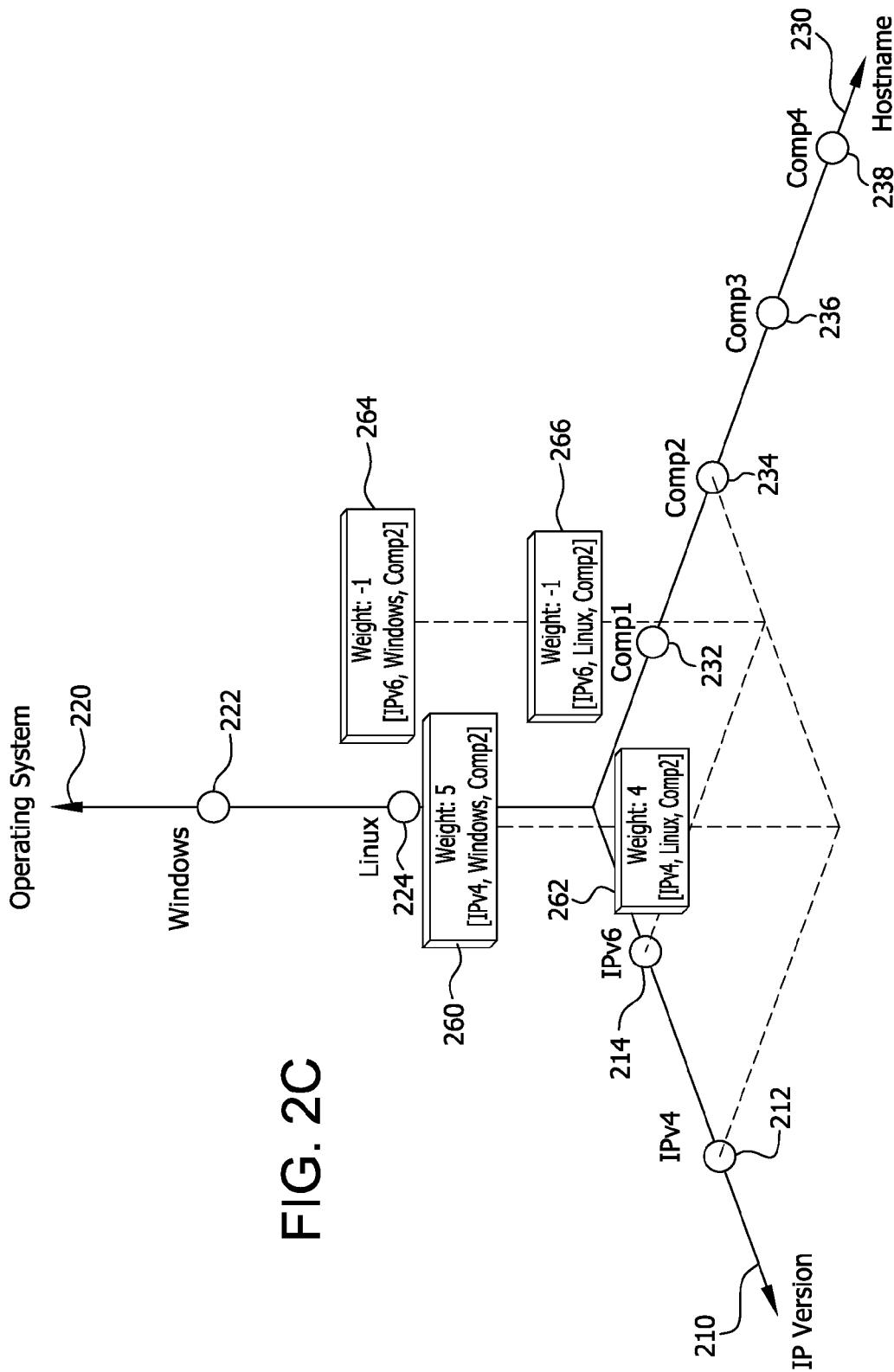
Figure 2D:
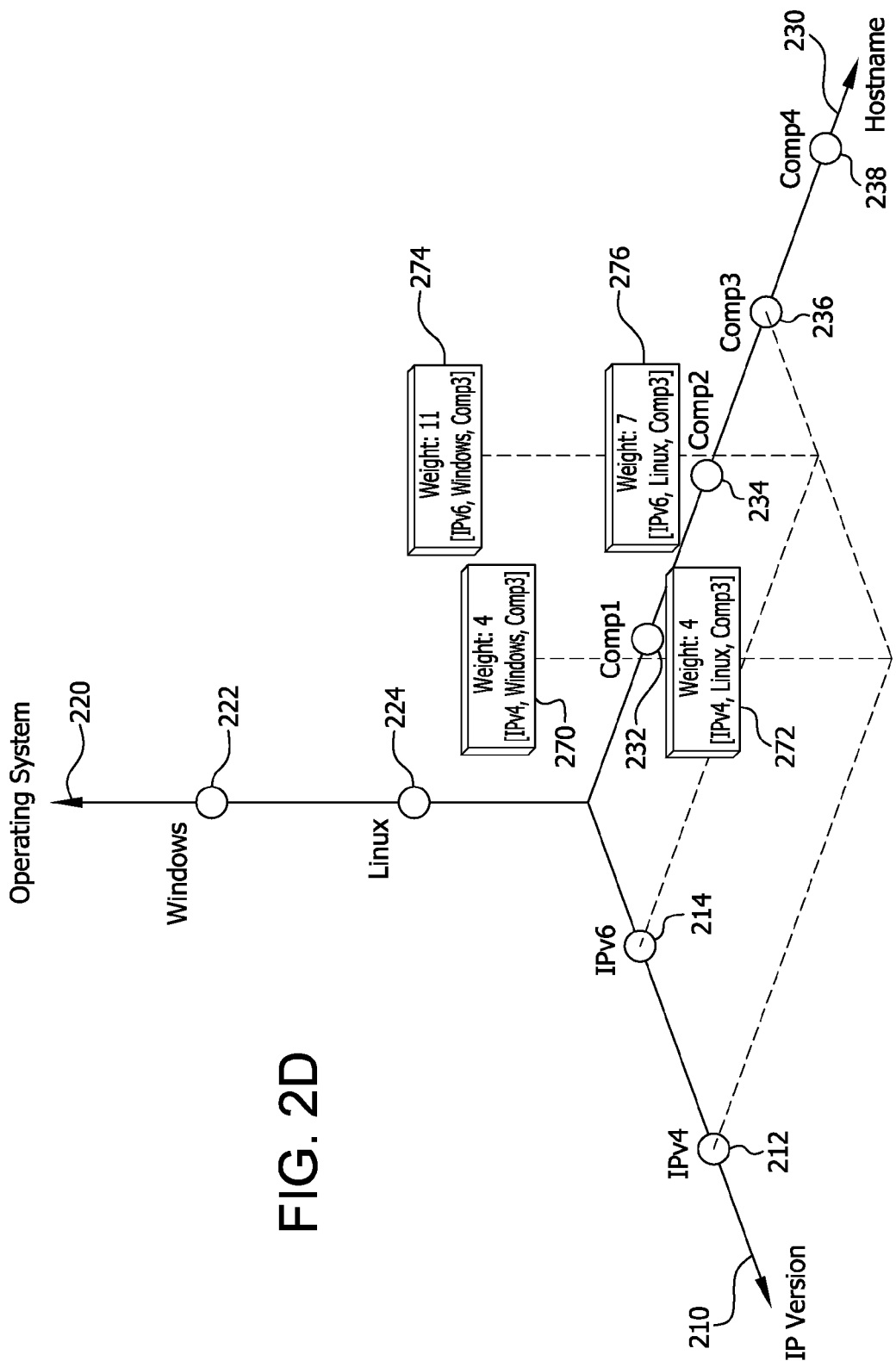
Figure 2E:
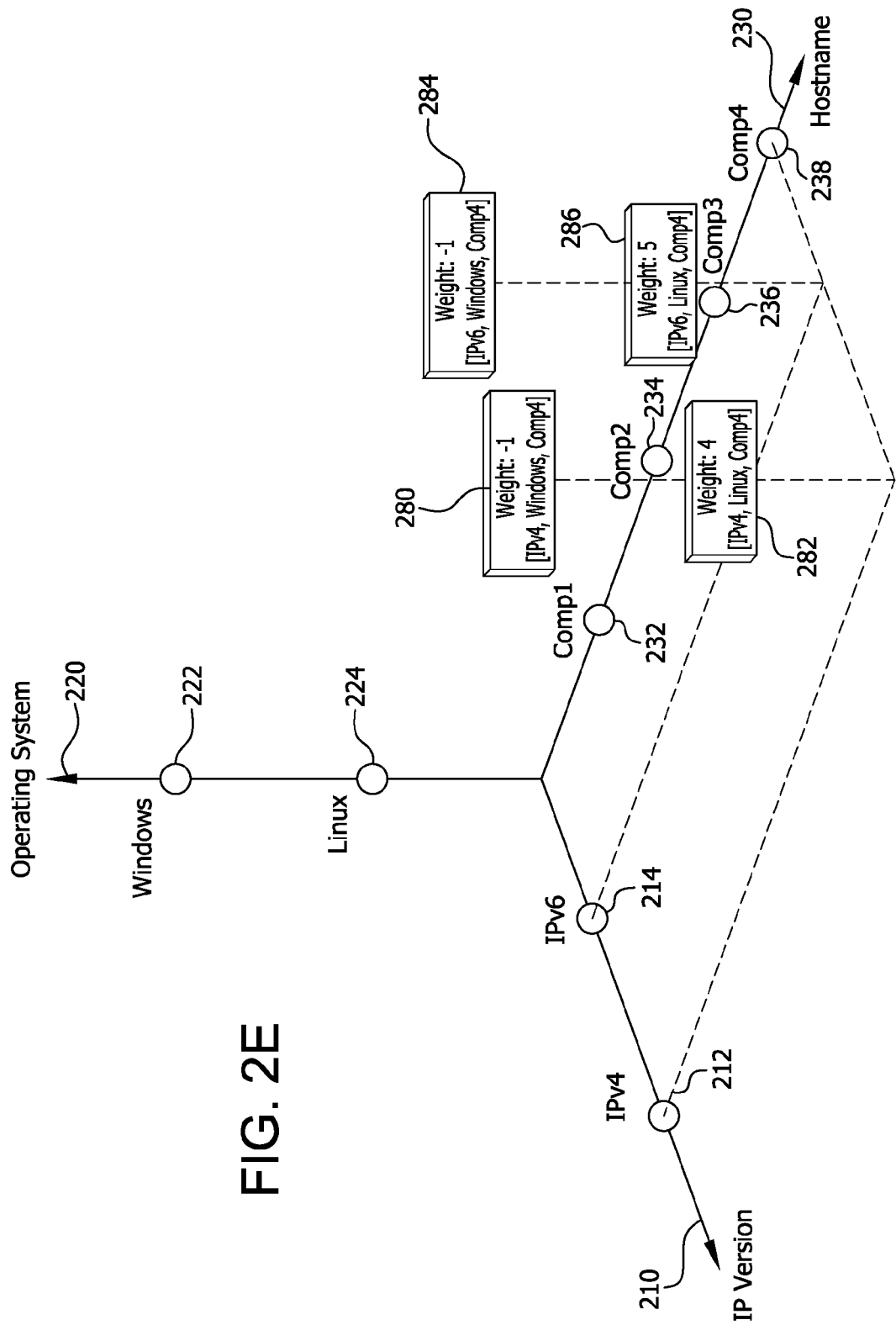

Similar to FIG. 2B, FIGS. 2C-2D show the following coordinate points: FIG. 2C shows a first coordinate point 260, second coordinate point 262, third coordinate point 264, and fourth coordinate point 266 that correspond to the attributes of Computer 2; FIG. 2D shows the coordinate points 270, 272, 274, 276 that correspond to the attributes of Computer 3; and FIG. 2E shows the coordinate points 280, 282, 284, 286 that correspond to the attributes of Computer 4.

Table 4, included below, is alternative view of the data shown in Table 3 and FIGS. 2A-2E:

TABLE 4

| | Hostname Axis | Operating System Axis | IP Version Axis | Weight |
|---|---|---|---|---|
| Computer 1 | Comp1 | Linux | IPv4 | 10 |
| | Comp1 | Linux | IPv6 | −1 |
| | Comp1 | Windows | IPv4 | 5 |
| | Comp1 | Windows | IPv6 | −1 |
| Computer 2 | Comp2 | Linux | IPv4 | 4 |
| | Comp2 | Linux | IPv6 | −1 |
| | Comp2 | Windows | IPv4 | 5 |
| | Comp2 | Windows | IPv6 | −1 |
| Computer 3 | Comp3 | Linux | IPv4 | 4 |
| | Comp3 | Linux | IPv6 | 7 |
| | Comp3 | Windows | IPv4 | 4 |
| | Comp3 | Windows | IPv6 | 11 |
| Computer 4 | Comp4 | Linux | IPv4 | 4 |
| | Comp4 | Linux | IPv6 | 5 |
| | Comp4 | Windows | IPv4 | −1 |
| | Comp4 | Windows | IPv6 | −1 |

To provide flexibility in how the computing resources and related features are defined, axes/dimensions can be added and/or removed from a scheduling model. The following tables (Table 5 and Table 6) show an example of how weights may be handled when an axis/dimension is added to a scheduling model. In this example, Table 5 shows data in a scheduling model that has two axes/dimensions, while Table 6 shows data related to the same scheduling model after a third axis/dimension is added. This example relates to a testing environment that includes two test computers (Computer 1 and Computer 2). One of the axes relates to the hostnames of the computers, and the second axis relates to whether each of the computers supports 32-bit operating systems and/or 64-bit operating systems.

TABLE 5

| | Hostname Axis | OS Bits Axis | Weight |
|---|---|---|---|
| Computer 1 | Comp1 | 32-bit | 4 |
| Computer 1 | Comp1 | 64-bit | 10 |
| Computer 2 | Comp2 | 32-bit | 5 |
| Computer 2 | Comp2 | 64-bit | 5 |

Another axis/dimension may be added to the scheduling model as shown in Table 6. As an example, a dimension that relates to supported IP versions of the computers may be added. This is shown in Table 6, as follows:

TABLE 6

| | Hostname Axis | OS Bits Axis | IP Version Axis | Weight |
|---|---|---|---|---|
| Computer 1 | Comp1 | 32-bit | IPv4 | 4 |
| | Comp1 | 32-bit | IPv6 | 4 |
| | Comp1 | 64-bit | IPv4 | 10 |
| | Comp1 | 64-bit | IPv6 | 10 |
| Computer 2 | Comp2 | 32-bit | IPv4 | 5 |
| | Comp2 | 32-bit | IPv6 | 5 |
| | Comp2 | 64-bit | IPv4 | 5 |
| | Comp2 | 64-bit | IPv6 | 5 |

When the IP version dimension is added to the two-dimensional version of the scheduling model (to effect the transition shown between Table 5 and Table 6), weight values from coordinate points in the two-dimensional version of the scheduling model are replicated to populate the corresponding weights in the three-dimensional version of the scheduling model. For example, as shown in Table 5, the weight at [Comp1, 32-bit] is 4; therefore, the corresponding weights in Table 6 at [Comp1, 32-bit, IPv4] and [Comp1, 32-bit, IPv6] are also set to be 4.

In the scheduling model, weights may be represented in a number of different ways. As one example, each weight may be represented as a single numeric value, using an integer or floating point data type. As another example, a "complex" (or "aggregate") weight may be used. A complex weight is a weight parameter where the numeric value of the weight is based on the values of a number of sub-weights, which are balanced relative to each other according to their respective levels of importance. For example, a complex weight may be made up of a first sub-parameter that relates to task outcome (pass/fail), a second sub-parameter that relates to task execution time, and a third sub-parameter that relates to achieved performance score. Equation 1, included below, shows how the value for this example complex weight may be represented:

$$\text{COMP\_WEIGHT} = (B1 \times \text{OUTCOME}) + (B2 \times \text{EXEC\_TIME}) + (B3 \times \text{SCORE}) \quad \text{[EQUATION 1]}$$

The variables in Equation 1 have the following meanings: COMP_WEIGHT is the numeric value for the complex weight; OUTCOME relates to task outcomes (pass/fail);

EXEC_TIME relates to task execution time; SCORE relates to achieved performance scores); and B1, B2, and B3 are balancing factors. According to Equation 1, the values for each of B1, B2, and B3 have decimal values between 0.0 and 1.0, and the sum of the three values is 1.0. The values for B1, B2, and B3 can each be adjusted, so that the values for OUTCOME, EXEC_TIME, and SCORE have a greater or smaller influence over the final value for COMP_WEIGHT.

Although examples are provided above of scheduling models that include two and three axes, it should be understood that any number of axes (as well as any number of individual coordinate points on an axis) may be used. Using a large number of axes, this scheduling model can be used to model very complex systems. And, because the scheduling model can be changed via the addition or subtraction of axes (and/or individual points on an axis), the scheduling model affords a great deal of ease and flexibility when changes to a model are required.

Referring now to FIGS. 1A-1B, the method 100 of FIGS. 1A-1B may be performed in a number of different computing environments. As an example, the method 100 of FIGS. 1A-1B may be executed by a processor in a computing device, in combination other components, such as a memory device, a network interface, a persistent storage device, a display device and/or user input device, and/or other appropriate components. Some examples of the computing devices in which the method 100 of FIGS. 1A-1B may be implemented are described in detail below with reference to FIGS. 3-5.

As shown in FIG. 1A, the method 100 of FIGS. 1A-1B begins with initializing a scheduling model (step 102). This may include actions such as reading in data that makes up the scheduling model from one or more persistent data storage devices, receiving data that describes the model via input from one or more users and/or via a wired or wireless communication network, and/or storing/loading the representation of the scheduling model into a memory device. The scheduling model includes information regarding available computing resources, represented in the axes/weight format described above. In the example of FIGS. 2A-2E, this step would include loading the information that is shown in FIGS. 2A-2E.

After the scheduling model is initialized, the steps 120, 122, 124, 126 in the "Process and execute computing tasks" area 190 and the steps 110, 112 in the "Periodically decrement weights" area 180 are performed. These steps 110, 112, 120, 122, 124, 126 are shown in these respective different areas 180, 190 to indicate that the steps 110, 112, 120, 122, 124, 126 in these two different areas 180, 190 may be performed in separate threads of control, independently of each other.

At step 120, information is obtained regarding a computing task to be scheduled. This may include, for example, receiving one or more messages via a network that defines the computing task, reading information related to the task into a memory device, advancing within an ordered data structure (such as a list or a queue) that includes information related to a number of tasks to arrive the next computing task in the data structure, and/or other types of processing. The information regarding the computing task may include information such as: information that describes how the task itself is performed (e.g., processor-executable instructions that make up the test); constraints on the type of computing resource that the computing task requires to be executed on (e.g., the computing task must be executed on a computer that supports a particular version of IP and/or a particular operating system); information that indicates preferences as to the computing resource that the task will be executed on (e.g., a computer at one location versus another location would be preferred); relative weights of preferences; information that identifies the source of the task (e.g., an IP address or hostname of a computer that transmitted a request for execution of the task); and/or other information. Alternatively, or additionally, in an instance where the scheduling model includes complex/aggregate weights, the information regarding the computing task may indicate how different sub-parameters should be balanced against each other. For example, if an equation/formula such as Equation 1 (mentioned above) is used to define weights, the task information may include data such as values for the balancing factors B1, B2, and B3.

At step 122, a computing resource is selected from the scheduling model for execution of the computing task. FIG. 1B shows further detail regarding how step 122 may be performed.

At step 152 in FIG. 1B, a target axis that includes a unique identifier for each of the available computing resources is identified. In the example of FIGS. 2A-2E, the "Hostname" axis 230 includes coordinates (the "Comp1" coordinate 232, the "Comp2" coordinate 234) that are unique to each of the available computing resources, and so on, and step 152 would include the selection of the "Hostname" axis 230.

At step 154, the coordinate points in the coordinate system in the scheduling model that meet the requirements of the computing task are determined. This may include analyzing the constraints on the type of computing resource that the computing task requires to be executed, to determine which coordinate points are associated with a computing resource that meets the constraints. As an example, a computing task may be a software unit test that must be executed on a computer on which a Linux-based operating system is installed. With this example computing task as applied to the example scheduling model of FIGS. 2A-2E, step 156 would include analyzing the coordinate points in the model to determine which are associated with computers on which Linux is installed. As described above with reference to FIGS. 2A-2E and Tables Three and Four, Computer 2 does not have Linux installed; thus, in this example, Computer 2 would not be further considered as a potential computing resource on which the unit test can be executed, and coordinate points that correspond to Computer 2 will not be further considered. Alternatively or additionally, step 154 may include reconfiguring computing resources that do not meet the requirements/constraints of the computing task, such that the computing resources (when reconfigured) do meet the requirements/constraints of the computing task. As an example of this, instead of not considering Computer 2 because Computer 2 does not have Linux installed (as described in the above example), a Linux distribution could be installed onto Computer 2. After Linux is installed onto Computer 2, the scheduling model (including the coordinate points and weights in the scheduling model) could then be updated to reflect that Computer 2 supports Linux, and then the above analysis (for determining which coordinate points are associated with computing resources that meet the constraints of the task) could be performed again with the updated scheduling model.

Next, at step 156, the weights in the coordinate points in the scheduling model are analyzed to determine, out of the coordinate points that are associated with computing resources that satisfy the constraints of the computing task (as determined at step 154), which coordinate point has the highest weight. In an instance where there is a tie (i.e., two or more coordinate points have the same highest weight), then one of the coordinate points that is involved in the tie would be selected at random. Referring again to the above example of the unit test computing task as applied to the scheduling model of FIGS. 2A-2E, the following table (Table 7, which includes a subset of the information shown in Table 4) shows the coordinate points that would be considered:

TABLE 7

| Indices of Coordinate Point | | | |
|---|---|---|---|
| IP Version Axis | OS Axis | Hostname Axis | Weight for Coordinate Point |
| IPv4 | Linux | Comp1 | 10 |
| IPv4 | Windows | Comp1 | 5 |
| IPv6 | Linux | Comp1 | −1 |
| IPv6 | Windows | Comp1 | −1 |
| IPv4 | Linux | Comp3 | 4 |
| IPv4 | Windows | Comp3 | 4 |
| IPv6 | Linux | Comp3 | 7 |
| IPv6 | Windows | Comp3 | 11 |
| IPv4 | Linux | Comp4 | 4 |
| IPv4 | Windows | Comp4 | −1 |
| IPv6 | Linux | Comp4 | 5 |
| IPv6 | Windows | Comp4 | −1 |

As shown in Table 7, the coordinate point with the highest weight is at index [IPv6, Windows, Comp3]; this coordinate point is shown as the third coordinate point 274 in FIG. 2D. In this example, this coordinate point would be selected at step 156, as it has the highest weight out of the coordinate points that are associated with computing resources that satisfy the constraints of the computing task.

Then, at step 158, the coordinate from the target axis that corresponds to the coordinate point with the highest weight (as selected at step 156) is selected. As mentioned above, the coordinates on the target axis uniquely identify one of the available computing resources; thus, the computing resource on which the computing task will be executed is identified by the coordinate from the target axis that is selected at step 158. Referring to the above example of Table 7 and FIGS. 2A-2E, at step 158, the "Comp3" coordinate 236 from the "Hostname" axis 230 would be selected, as "Comp3" is the hostname that corresponds to the coordinate point with the highest weight.

Referring back to FIG. 1A, after the computing resource is selected at step 122, the computing task is executed at the selected computing resource at step 124. In an instance where the selected computing resource is a processor core in a multi-core processor and the computing task is a block of instructions, step 124 would include the selected processor core executing the block of instructions. In the example of Table 7 and FIGS. 2A-2E mentioned above, this step would include the selected computer (Computer 3, which has the hostname of "Comp3") executing the unit test.

At step 126, the weights in the scheduling model are updated to reflect the results of the execution of the computing task as performed at step 124. If for example, the execution of the computing task was successful (i.e., it executed without errors and/or within an acceptable timeframe), then the weights in the scheduling model that are associated with the computing resource that executed the computing task are increased; if the execution of the computing task was unsuccessful, then the weights in the scheduling model that are associated with the computing resource that executed the task are decreased.

The updating of the weights (step 126) may be performed in a number of different ways. In some instances, successful/failure may be seen as a binary determination (i.e., the task either succeeded or failed, and partial successes are not accounted for), and weights may be incremented/decremented accordingly. As one example of this, success may be defined as completing a task within a given time; if the task is completed within the given time, then the weights associated with the computing resource that executed the task may be increased by a value of 10; and if the task takes longer than the given time to complete, then weights may be decreased by a value of 10. Alternatively, success/failure can be defined on an intermediate/incremental scale. As one example of this, the following methodology may be applied to determine how to increase/decrease weights: if a task is finished within 2 second, weights are increased by 10 points; if the task is finished within 2 to 4 seconds, weights are increased by 5 points; if the task is finished within 4 to 6 seconds, weights are not increased/decreased; if the task is finished within 6 to 8 seconds, weights are decreased by 5 points; and if the task requires longer than 8 seconds, weights are decreased by 10 points.

Alternatively or additionally, weights that correspond to different coordinate points associated with the resource that executed the computing task may be updated differently, dependent upon whether a coordinate point was selected at step 156 as being the coordinate point with the highest weight or not. For example, and referring again to the above example of Table 7, wherein the coordinate point [IPv6, Windows, Comp3] was selected, this may be performed as follows: If the computing task is executed successfully, then the weight associated with the selected coordinate point ([IPv6, Windows, Comp3]) may be increased by a first value (for example, a value of 10); but for the other coordinate points that are also associated with Computer Three (i.e., [IPv6, Linux, Comp3], [IPv4, Windows, Comp3], and [IPv4, Linux, Comp3]) but that were not selected at step 156, these coordinate points may be increased by a second value that is smaller than the first value (for example, a value of 5). As an alternative to this, all of the coordinate points that are associated with the resource that execute the computing task may be updated (increased/decreased) by the same amount.

Alternatively or additionally, in an instance where complex weights are used, updating the weights may include evaluating one or more equations/formulas that define the complex weights, and updating the weights accordingly.

According to some implementations, regardless of the approach or combination of approaches that are used at step 126 to update the weights, weights that are at 0 or above are not decreased to go below 0, and weights that have a value of −1 are not increased to go above −1.

After the weights are updated, at step 128, the method 100 waits (if necessary) until information regarding the next computing task to be scheduled has been received. If information regarding the next computing task to be scheduled has already been received, then the method may proceed back to step 120, to repeat steps 120 through 128 with the next computing task.

As mentioned above, the steps 120, 122, 124, 126 in the "Process and execute computing tasks" area 190 in FIG. 1A and the steps 110, 112 in the "Periodically decrement weights" area 180 may be performed in separate threads of control, independently of each other. As step 110, any of the weights in the scheduling model that have a value of 1 or above are decremented (i.e., decreased). The weights are decremented by a value such as 1, 2, 5, or 10, or any other appropriate value. The weights are not, however, decremented such that their values go below 0. Depending upon the implementation, in an instance where the steps 120, 122, 124, 126 in the "Process and execute computing tasks" area 190 in FIG. 1A and the steps 110, 112 in the "Periodically decrement weights" area 180 are performed in separate threads of control, the two threads of control may be synchronized such that step 110 and step 126 are not performed concurrently, so that weights are not being decremented (in step 110) at the same time that weights are being updated (in step 126).

Then, at step 122, the method 100 of FIG. 1 waits for a predetermined time period. This time period may be, for example, one minute, one hour, six hours, or any appropriate time period. Once this time period has expired, the method 100 of FIG. 1 returns to step 110, and steps 110 through 112 are repeated.

As mentioned above with reference to step 126, the weights in the scheduling model are updated to reflect the results of the execution of the computing task as performed at step 124. This has the effect that the computing resources that are effective at executing computing tasks will be selected more often, while the computing resources that are not as effective (i.e., those resources where tasks are frequently not successfully completed) will be selected less often. Additionally, by having the steps 110, 112 in the "Periodically decrement weights" area 180 periodically decrement the weights in the scheduling model, this ensures that the impact of past successes is lessened over time and that the weights reflect the more recent performance of the different resources.

In addition to and/or as alternatives to the features described above with reference to FIGS. 1A-1B, a number of variations to the method 100 of FIGS. 1A-1B (and the scheduling model described herein) may be used. For example, in addition to the information about computing tasks described above, computing tasks may be associated with relative priorities, and scheduled according to their relative priorities. Further, other factors in addition to those described above may be taken into account in selecting a computing resource for execution of a task, such as information that indicates whether particular computing resources are currently in demand and/or available, and information that is predictive of whether particular resources may be in demand in the future.

Figure 3:
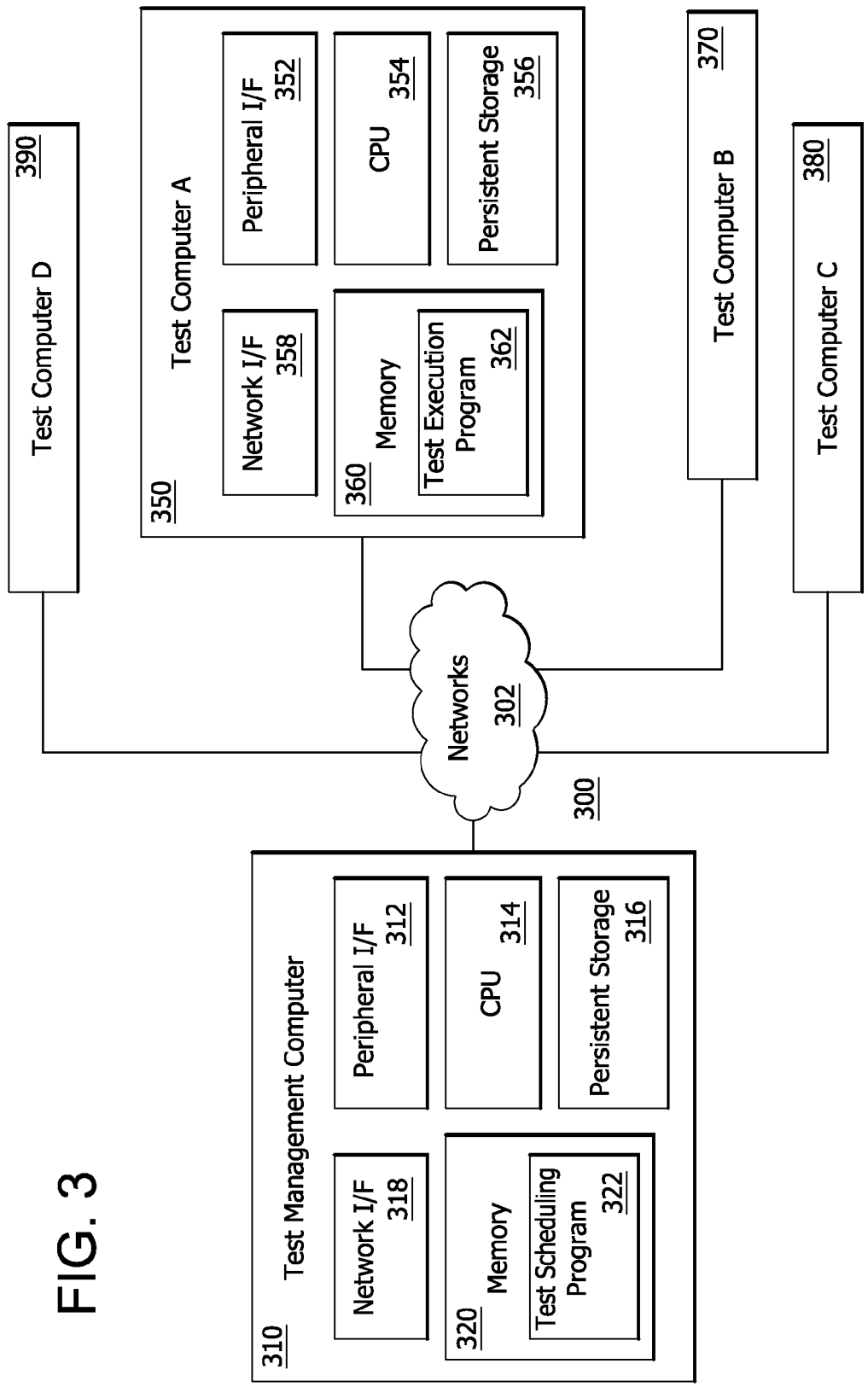
FIG. 3 shows an example of a computing system that may be used for the allocating of computing resource to execute computing tasks.

FIG. 3 shows an example computing system 300 wherein features described herein may be implemented. The example computing system 300 of FIG. 3 is a distributed software testing environment, wherein computing tests (such as performance benchmarks, unit tests, or other kinds of tests) are allocated for performance across a number of different test computers that are connected via a network. The computing system 300 of FIG. 3 includes a test management computer 310 and four test computers (Test Computer A 350, Test Computer B 370, Test Computer C 380, and Test Computer D 390), which are connected via one or more networks 302. The one or more networks 302 may include one or more wired and/or wireless networks, and may be based on technologies such as Institute of Electrical and Electronics Engineers (IEEE) 802.3 technology, 802.11 technology, and/or wireless cellular technologies.

The Test Management Computer 310 includes a peripheral interface 312 (for connecting to devices such as a display device or a user input device such as a mouse or keyboard), a CPU 314, persistent storage device 316 (which may be, for example, a hard disk or a solid-state drive (SSD)), a network interface 318 (which may be, for example, a wired or wireless transceiver), and a memory device 320 (which may be, for example, a random access memory (RAM)). The Test Management Computer 310 also includes a test scheduling program 322, which is loaded into the memory device 320 and which is executed by the CPU 314.

Test Computer A 350 includes a peripheral interface 352, a CPU 354, persistent storage device 356, a network interface 358, and a memory 360. Test Computer A 350 also includes a test execution program 362, which is loaded into the memory 360 and is executed by the CPU 354. Although omitted from FIG. 3 for ease of description, the other test computers 370, 380, 390 also include components that are the same or similar to the components 352, 354, 356, 358, 360 shown in Test Management Computer A 350, and the other test computers 370, 380, 390 also execute a Test Execution Program that is the same as or similar to the test execution program 362 shown in Test Computer A 350.

The test scheduling program 322 is programmed to implement the method 100 of FIGS. 1A-1B. In this example implementation, the computing tests executed in the computing system 300 constitute computing tasks, and the test computers 350, 370, 380, 390 constitute computing resources.

The test scheduling program 322 provides a user interface that the user of Test Management Computer 310 may use to initiate the execution of a test on one of the test computers 350, 370, 380, 390. With this user interface, the user can input information to define the test. This information may include the code to be executed during the test, as well as parameters that specify a target resource on which the test should be executed. For example, the user may input information that indicates that the test should be performed on a computer that has a particular operating system, a particular type of CPU, a particular type of Graphics Processing Unit (GPU), on a computer that has a minimum or maximum amount of memory, or on a computer that has certain software packages loaded on it. The information may also indicate that some parameters are preferences, and/or that some are mandatory. Further, the information may indicate the priority of different parameters with respect to each other.

Once the user has defined the test, the test scheduling program 322 determines which of the test computers 350, 370, 380, 390 should perform the test. The test scheduling program 322 may determine which of the test computers 350, 370, 380, 390 should perform the test as described above with reference to step 122 of FIGS. 1A-1B. Then, the test scheduling program 322 sends one or more messages to the task execution program (such as the test execution program 362 from Test Computer A) on the selected target computer. The test execution program on the target computer then runs the test (as described above with reference to step 124 of FIGS. 1A-1B). Upon completion of the test, the test execution program that ran the test transmits one or more messages to the test scheduling program 322 that includes test result information related to the test run. This test result information may indicate, for example, whether the test was successful, the duration of the test, and/or other information. Upon receiving the test result information, the test scheduling program 322 may update the weights in the scheduling model used by the test scheduling program 322, as described above with reference to step 124 of FIGS. 1A-1B. The test scheduling program 322 may also periodically decrement the weights, as described in steps 110 and 112 of FIGS. 1A-1B.

Figure 4:
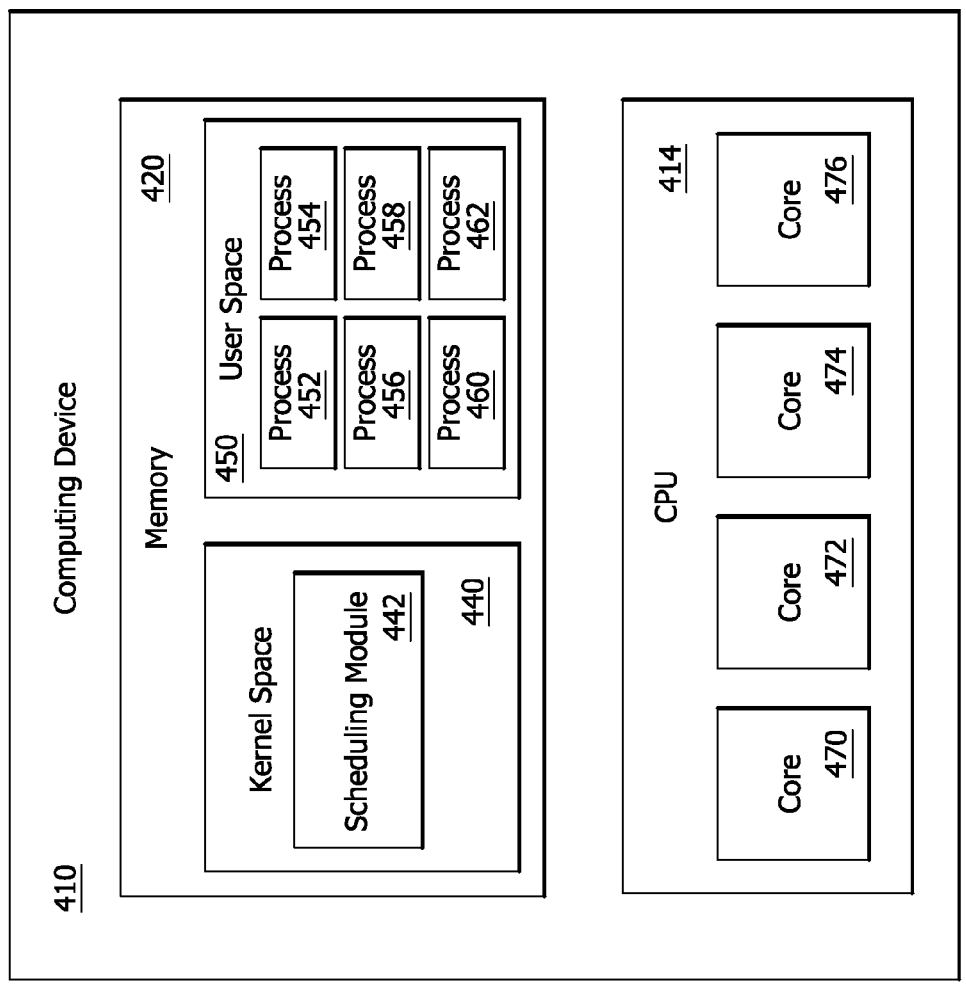
FIG. 4 shows an example of a computing device that may be used for the allocating of computing resource to execute computing tasks.

FIG. 4 shows an example computing device 410 wherein features described herein may be implemented. The computing device 410 of FIG. 4 may be, for example, a desktop computer, a laptop computer, a tablet computer, a netbook, a smartphone, a personal digital assistant (PDA), or any other appropriate type of computing device or data processing device. The computing device 410 includes a memory device 420 and a CPU 414. The computer device 410 may also include other components (not depicted in FIG. 4), such as a peripheral interface, a display device, a network interface, and/or a persistent storage device.

The CPU 414 in the computing device executes an operating system for the computing device 410. Information that is used by the operating system (and applications and processes that run on top of the operating system) is stored in the kernel space 440 and the user space 450 in the memory device 420. The kernel space 440 stores information for use by the kernel of the operating system, and includes a scheduling module 442. The user space 450 includes information associated with a number of user mode processes 452, 454, 456, 458, 460, 462 that are executed by the operating system. The CPU 414 includes four cores 470, 472, 474, 476.

The scheduling module 442 is programmed to implement the method of FIGS. 1A-1B. In this example implementation of the method of FIGS. 1A-1B, the four cores 470, 472, 474, 476 constitute computing resources, and blocks of instructions that are associated with the user mode processes 452, 454, 456, 458, 460, 462 (and which are executable by the cores 470, 472, 474, 476) constitute the computing tasks. The blocks of instructions may be intermediate instructions (which are later translated into native instructions for execution by a core), and/or may be native/processor-specific instructions, and/or may include any other appropriate type of instruction.

When a block of instructions from one of the processes 452, 454, 456, 458, 460, 462 needs to be executed, the scheduling module 442 determines which of the cores 470, 472, 474, 476 should execute the block of instructions, as described above with reference to step 122 of FIGS. 1A-1B. In some instances, the blocks of instructions may indicate the use of specific core registers (such as, for example, rax, rbx, rcx, rdx, and/or other registers, dependent upon the architecture of the CPU 414 and other factors), and the scheduling module may determine which cores 470, 472, 474, 476 should be used to execute the instructions based on the registers indicated in the instructions, and/or other factors.

After the scheduling module 442 determines which of the cores 470, 472, 474, 476 should be allocated to execute the block of instructions, the selected core 470, 472, 474, 476 then executes the block of instructions. The scheduling module 442 may periodically decrement the weights in the scheduling model used by the scheduling module 442, as described in steps 110 and 112 of FIGS. 1A-1B.

Although examples are provided above wherein the scheduling module 442 schedules blocks of instructions, it should be understood that the scheduling module 442 may alternatively or additionally schedule tasks that are defined as: a method or function call; a program; a body of a loops of instructions (or a kernel); and/or any other type of construct or organization unit for defining actions that can be performed by the cores 470, 472, 474, 476.

Although FIG. 4 shows that the computing device 410 includes a single CPU 414 and that the scheduling module 442 is included in kernel space 440, it should be understood that many variations on the features shown in FIG. 4 are possible. For example, the computing device 410 may include multiple CPUs (each with multiple cores), and when instructions from one of the processes 452, 454, 456, 458, 460, 462 need to be executed, the scheduling module 442 may schedule blocks of instructions for execution across cores in the multiple CPUs. As another example, the computing device 410 many include processors of multiple different types (for example, one or more CPUs and one or more GPUs), where each of the processors includes one or more cores, and the scheduling module 442 may schedule blocks of instructions for execution across the different processors, on a per-processor and/or per-core basis. Alternatively or additionally, the scheduling module 442 may not be implemented as part of the operating system in the computing device 410 (as is shown in FIG. 4), but may be implemented in one or more of the processors in the computing device 410. As one example of how this may be implemented, the scheduling module 442 may be implemented in the gate array (and/or in some other component) of the CPU 414. In yet another alternative, the scheduling module 442 may be implemented in the user space 450 in the computing device 410.

In the example of FIG. 4, axes/dimensions and related coordinate points that may be used include: a core type dimension (with coordinates such as CPU and GPU); a dimension that indicates the number of rendering pipelines per core in a GPU (with coordinates such as 64, 128, and 256); a dimension that indicates the accessible amount of L1/L2 cache per core in a CPU (with coordinates such as 256 Mb, 512 Mb, and 1024 Mb); and/or other dimensions and related coordinate points.

Figure 5:
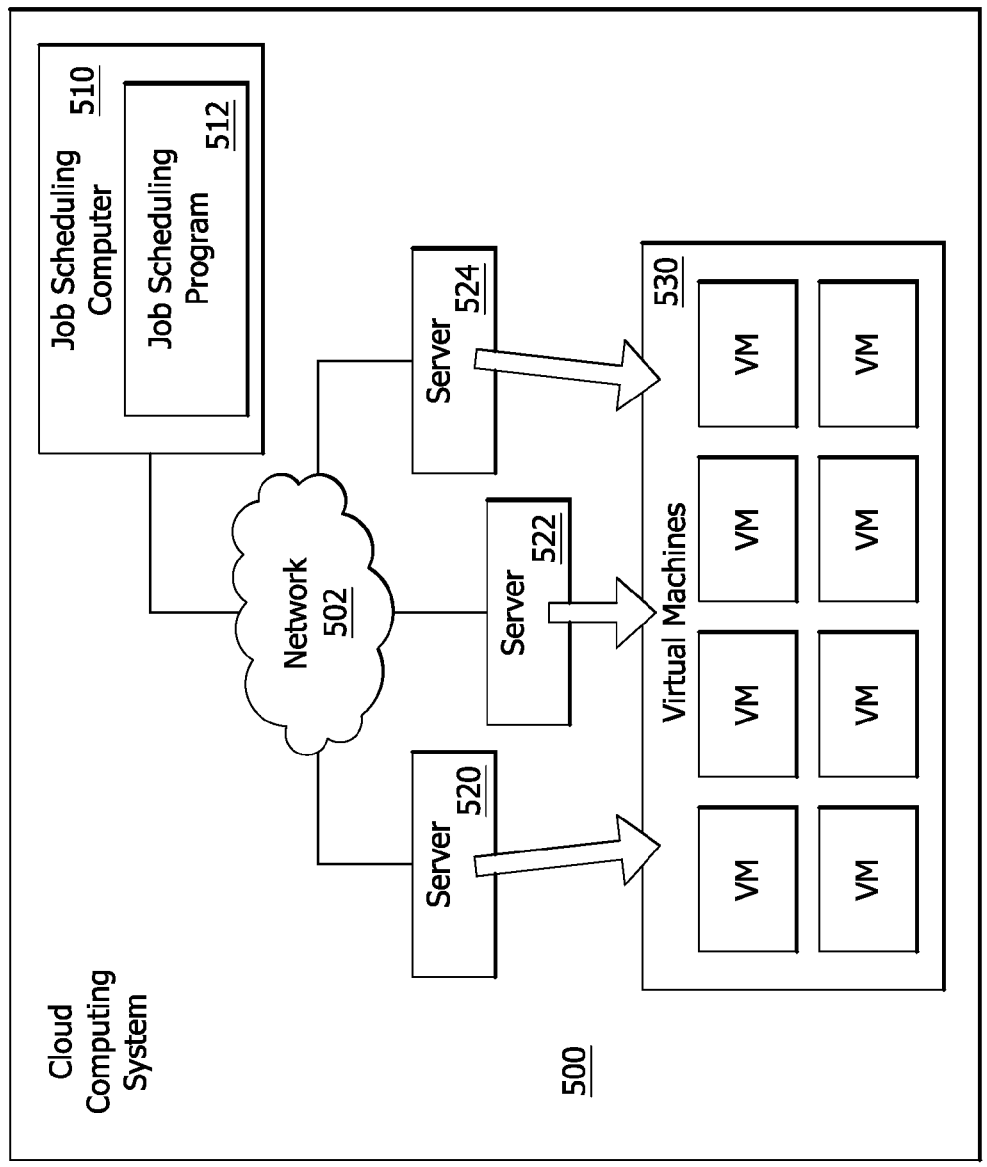
FIG. 5 shows an example of a cloud computing system that may be used for the allocating of computing resource to execute computing tasks.

FIG. 5 shows an example of a cloud computing system 500 wherein features described herein may be implemented. The cloud computing system 500 includes three server computers 520, 522, 524 and a job scheduling computer 510, which are connected via a network 502. Although omitted from FIG. 5 for ease of description, the cloud computing system 500 may also include one or more databases, networking equipment (such as routers and/or switches), other servers that implement cloud functionality, and/or other appropriate components for implementing cloud computing technology. The server computers 520, 522, 524 execute programs that produce the virtual machines 530.

The job scheduling computer 510 includes a job scheduling program 512, which is stored in a memory device (not depicted in FIG. 5) in the job scheduling computer 510 and which is executed by a CPU (not depicted in FIG. 5) in the job scheduling computer 510. The job scheduling program 512 is programmed to implement the method of FIGS. 1A-1B. In this example implementation of the method of FIGS. 1A-1B, the virtual machines 530 constitute computing resources, and jobs that are executed by the virtual machines 530 constitute the computing tasks. In the example of FIG. 5, examples of axes/dimensions that may be used include: a dimension that indicates virtual machine hostnames; a dimension that indicates types of operating systems supported by a virtual machine; a dimension that indicates IP versions supported by a virtual machine; a dimension that indicates resources (such as file servers or other resources) that are available to a virtual machine); a dimension that indicates that a given application is installed on a virtual machine; and/or other dimensions. Some examples of job constraint that may be used in this context include: a required operating system; a required IP version; the availability of a required resource (such as a file server or other type of resource); whether a given application is installed on the virtual machine; and/or other constraints.

When a client computing device (also not shown in FIG. 5) requests that the cloud computing system 500 perform some action, the job scheduling program 512 receives information about the job, and determines which of the virtual machines 530 should perform the job, as described above with reference to step 122 of FIGS. 1A-1B. After the job scheduling program 512 determines which of the virtual machines 530 should be allocated to executing the job, the selected virtual machine 530 then executes the job. The job scheduling program 512 may periodically decrement the weights in the scheduling model used by the job scheduling program 512, as described in steps 110 and 112 of FIGS. 1A-1B.

Although a number of actions are described above as being performed by software programs or modules (such as the test scheduling program 322, test execution program 362, the scheduling module 442, and the job scheduling program 512), this is done for ease of description and it should be understood that these actions are performed by the processors (in conjunction with the persistent storage devices, network interfaces, memory devices, and/or peripheral device interfaces) in the computing devices 310, 350, 410, 510 where the programs 332, 362, 442, 512 are stored, as specified by the instructions that make up these software programs/modules 322, 362, 442, 512.

Similarly, it should be also be understood that, when it is described herein that a virtual machine executes a job (for example, as described above with reference to FIG. 5), that the processor (in conjunction with the persistent storage devices, network interfaces, and/or memory devices) in the computing device on which the virtual machine is running executes the instructions that define the job.

Although a number of examples are provided above wherein the method 100 of FIGS. 1A-1B and related features may be performed, it should be understood that these are only examples, and that the features described herein may be implemented in any appropriate context. As one further example of how the features described herein may be implemented, a source code compiler program may use the features described herein to generate processor-executable code, wherein portions of the code are assigned to particular processor cores.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a RAM, a register, cache memory, semiconductor memory devices, magnetic media such as internal hard disks and removable disks, magneto-optical media, and optical media such as CD-ROM disks, and digital versatile disks (DVDs). Suitable processors include, by way of example, a general purpose processor, a central processing unit (CPU), a graphics processing unit (GPU), a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the features described herein.

What is claimed is:

1. A method for selecting a computing resource to execute a computing task, the method comprising:
    accessing information that describes a plurality of computing resources,
        wherein the information that describes the computing resources is organized as a multidimensional coordinate system that includes a plurality of coordinate points,
        wherein each of the coordinate points corresponds to a computing resource from the plurality of computing resources,
        wherein each of the coordinate points corresponds to a combination of attributes of the computing resource to which the coordinate point corresponds, and
        wherein each of the coordinate points is associated with a weight;
    accessing information that defines a computing task, wherein the information that defines the computing task includes constraint information that defines constraints on computing resources on which the computing task can be executed;
    selecting, at a processor, a computing resource from the plurality of computing resources based on the information that describes the plurality of computing resources and the constraint information;
    the processor executing the computing task at the selected computing resource and;
    upon completion of the computing task, updating the weights with which the coordinate points are associated to indicate whether execution of the computing task was successful or unsuccessful.

2. The method of claim 1, wherein the selecting the computing resource from the plurality of computing resources includes:
    determining, at the processor, which of the coordinate points from the plurality of coordinate points are constraint-compliant coordinate points that meet the constraints defined in the constraint information;
    selecting, at the processor, a coordinate point from the constraint-compliant coordinate points that is associated with a highest weight; and
    selecting, at the processor, the computing resource from the plurality of computing resources that corresponds to the coordinate point that is associated with the highest weight.

3. The method of claim 1, further comprising:
    periodically decrementing the weights with which the coordinate points are associated.

4. The method of claim 1, wherein:
    the weights with which the coordinate points are associated are stored in a multidimensional array, and
    a value of −1 for a weight indicates that the combination of attributes to which the coordinate point corresponds is invalid.

5. The method of claim 1, wherein:
    the computing task is a software testing application, and
    the computing resources from the plurality of computing resources are computers.

6. The method of claim 5, wherein the software testing application is a benchmarking application or a unit test.

7. The method of claim 1, wherein:
    the computing task is a cloud computing job, and
    the computing resources from the plurality of computing resources are virtual machines.

8. The method of claim 1, wherein:
    the computing task is a block of processor-executable instructions, and
    the computing resources from the plurality of computing resources are processor cores.

9. The method of claim 8, wherein the processor cores are included in one or more central processing units (CPUs) and in one or more Graphics Processing Units (GPUs).

10. A system for allocating computing tasks for execution by computing resources, the system comprising:
    a plurality of computing resources;
    at least one memory device configured to store information that describes the plurality of computing resources,
        wherein the information that describes the computing resources is organized as a multidimensional coordinate system that includes a plurality of coordinate points, wherein each of the coordinate points corresponds to a computing resource from the plurality of computing resources,
wherein each of the coordinate points corresponds to a combination of attributes of the computing resource to which the coordinate point corresponds, and
wherein each of the coordinate points is associated with a weight; and
at least one processor configured to:
receive information that defines a computing task, wherein the information that defines the computing task includes constraint information that defines constraints on computing resources on which the computing task can be executed;
select a computing resource from the plurality of computing resources based on the information that describes the plurality of computing resources and the constraint information; and
update the weights with which the coordinate points are associated upon completion of the computing task to indicate whether execution of the computing task was successful or unsuccessful;
wherein the selected computing resource is configured to execute the computing task.

11. The system of claim 10, wherein the processor is configured to select the computing resource from the plurality of computing resources by:
determining which of the coordinate points from the plurality of coordinate points are constraint-compliant coordinate points that meet the constraints defined in the constraint information;
selecting a coordinate point from the constraint-compliant coordinate points that is associated with a highest weight; and
selecting the computing resource from the plurality of computing resources that corresponds to the coordinate point that is associated with the highest weight.

12. The system of claim 10, wherein the at least one processor is further configured to periodically decrement the weights with which the coordinate points are associated.

13. The system of claim 10, wherein:
the weights with which the coordinate points are associated are stored in a multidimensional array, and
a value of −1 for a weight indicates that the combination of attributes to which the coordinate point corresponds is invalid.

14. The system of claim 10, wherein:
the computing task is a software testing application, and
the computing resources from the plurality of computing resources are computers.

15. The system of claim 14, wherein the software testing application is a benchmarking application or a unit test.

16. The system of claim 10, wherein:
the computing task is a cloud computing job, and
the computing resources from the plurality of computing resources are virtual machines.

17. The system of claim 10, wherein:
the computing task is a block of processor-executable instructions, and
the computing resources from the plurality of computing resources are processor cores.

18. The system of claim 17, wherein the processor cores are included in one or more central processing units (CPUs) and in one or more Graphics Processing Units (GPUs).

19. A non-transitory computer-readable storage medium having stored thereon instructions which, when executed by at least one processor, cause the at least one processor to perform a method for allocating computing tasks for execution by computing resources, the method comprising:
the at least one processor storing, in a memory device, information that describes a plurality of computing resources,
wherein the information that describes the computing resources is organized as a multidimensional coordinate system that includes a plurality of coordinate points,
wherein each of the coordinate points corresponds to a computing resource from the plurality of computing resources,
wherein each of the coordinate points corresponds to a combination of attributes of the computing resource to which the coordinate point corresponds, and
wherein each of the coordinate points is associated with a weight;
the at least one processor receiving information that defines a computing task, wherein the information that defines the computing task includes constraint information that defines constraints on computing resources on which the computing task can be executed;
the at least one processor selecting a computing resource from the plurality of computing resources based on the information that describes the plurality of computing resources and the constraint information;
the at least one processor executing the computing task at the selected computing resource; and
upon completion of execution of the computing task, the at least one processor updating the weights with which the coordinate points are associated to indicate whether execution of the computing task was successful or unsuccessful.

20. The non-transitory computer-readable storage medium of claim 19, wherein the selecting the computing resource from the plurality of computing resources includes:
the at least one processor determining which of the coordinate points from the plurality of coordinate points are constraint-compliant coordinate points that meet the constraints defined in the constraint information;
the at least one processor selecting a coordinate point from the constraint-compliant coordinate points that is associated with a highest weight; and
the at least one processor selecting the computing resource from the plurality of computing resources that corresponds to the coordinate point that is associated with the highest weight.

21. The non-transitory computer-readable storage medium of claim 19, wherein the method further comprises:
periodically decrementing the weights with which the coordinate points are associated.

22. The non-transitory computer-readable storage medium of claim 19, wherein the computing resources from the plurality of computing resources are computers, processor cores, or virtual machines.

* * * * *